US010967592B2

(12) United States Patent
Behrens et al.

(10) Patent No.: US 10,967,592 B2
(45) Date of Patent: Apr. 6, 2021

(54) DEVICE AND METHOD FOR PRODUCING GREEN TYRES

(71) Applicant: HARBURG-FREUDENBERGER MASCHINENBAU GMBH, Hamburg (DE)

(72) Inventors: Achim Behrens, Asendorf (DE); Dieter Klinger, Wulfsen (DE)

(73) Assignee: HARBURG-FREUDENBERGER MASCHINENBAU GMBH, Hamburg (DE)

(*) Notice: Subject to any disclaimer, the term of this patent is extended or adjusted under 35 U.S.C. 154(b) by 367 days.

(21) Appl. No.: 15/518,070

(22) PCT Filed: Jul. 1, 2015

(86) PCT No.: PCT/DE2015/000337
§ 371 (c)(1),
(2) Date: Apr. 10, 2017

(87) PCT Pub. No.: WO2016/058572
PCT Pub. Date: Apr. 21, 2016

(65) Prior Publication Data
US 2017/0305091 A1    Oct. 26, 2017

(30) Foreign Application Priority Data
Oct. 14, 2014    (DE) .................... 10 2014 015 490.4

(51) Int. Cl.
*B29D 30/30*    (2006.01)
*B29D 30/00*    (2006.01)
*B29D 30/20*    (2006.01)

(52) U.S. Cl.
CPC ..... *B29D 30/3007* (2013.01); *B29D 30/0016* (2013.01); *B29D 30/30* (2013.01);
(Continued)

(58) Field of Classification Search
CPC .... B29D 30/0016; B29D 30/20; B29D 30/24; B29D 2030/0022
See application file for complete search history.

(56) References Cited

U.S. PATENT DOCUMENTS 4,105,487 A * 8/1978 Suzuki .................. B29D 30/20
156/406.2
4,120,717 A * 10/1978 Rost .................. B29D 30/3007
156/395

(Continued)

FOREIGN PATENT DOCUMENTS

DE    4232276 A1    4/1993
DE    19938151 A1    3/2001
(Continued)

*Primary Examiner* — Jacob T Minskey
*Assistant Examiner* — Cedrick S Williams
(74) *Attorney, Agent, or Firm* — Lucas & Mercanti, LLP; Klaus P. Stoffel

(57) ABSTRACT

A device for loading at least one carcass drum with tire components for green tires, a tire-building machine and a method for producing green tires. The device for loading the at least one carcass drum with tire components includes a placing device, which can move linearly in the horizontal direction, for delivering material components to a carcass drum, wherein the at least one placing device can be moved vertically so that a vertical movement in addition to or alternatively to the horizontal movement is facilitated and, in this way, the ply server is designed to be self-opening.

10 Claims, 4 Drawing Sheets

(52) U.S. Cl.
CPC ............... *B29D 2030/0022* (2013.01); *B29D 2030/207* (2013.01); *B29D 2030/208* (2013.01)

(56) References Cited

U.S. PATENT DOCUMENTS

| | | | |
|---|---|---|---|
| 4,531,561 A | | 7/1985 | Ippen et al. |
| 4,753,707 A | * | 6/1988 | Crombie ................ B29D 30/24 |
| | | | 156/396 |
| 4,769,104 A | | 9/1988 | Okuyama et al. |
| 4,792,370 A | * | 12/1988 | Goodfellow ........... B29D 30/00 |
| | | | 156/111 |
| 4,985,100 A | * | 1/1991 | Sasaki .................... B29D 30/08 |
| | | | 156/110.1 |
| 5,730,829 A | * | 3/1998 | Conger .................. B29D 30/20 |
| | | | 156/396 |
| 8,012,281 B2 | | 9/2011 | Marangoni |
| 2007/0107848 A1 | | 5/2007 | Hayashi et al. |
| 2009/0178766 A1 | | 7/2009 | Marangoni |
| 2015/0041067 A1 | * | 2/2015 | Lescaud ............ B29D 30/3028 |
| | | | 156/406.4 |

FOREIGN PATENT DOCUMENTS

| | | |
|---|---|---|
| DE | 102009025758 A2 | 11/2010 |
| DE | 102011001559 A1 | 9/2012 |
| EP | 0026315 A1 | 4/1981 |
| EP | 1785263 A1 | 5/2007 |
| JP | 2006062251 A | 3/2006 |
| WO | 2007088455 A2 | 8/2007 |
| WO | 2007093905 A1 | 8/2007 |
| WO | WO-2007093905 A1 * 8/2007 ........... B29D 30/005 |

* cited by examiner

DEVICE AND METHOD FOR PRODUCING GREEN TYRES

The present application is a 371 of International application PCT/DE2015/000337, filed Jul. 1, 2015, which claims priority of DE 10 2014 015 490.4, filed Oct. 14, 2014, the priority of these applications is hereby claimed and these applications are incorporated herein by reference.

BACKGROUND OF THE INVENTION

The invention relates to a device for producing tire blanks.

The invention furthermore relates to a method for producing tire blanks, using a tire building machine according to the invention.

Ply servers for feeding at least one carcass drum with tire components for tire blanks are provided within a tire building machine, wherein said ply servers for supplying material components to a carcass drum comprise at least one placing device that is movable in a linear manner in the horizontal direction.

The production of a tire, for example for vehicles such as automobiles or motorcycles, is an extremely complex process which is composed of a multiplicity of production and process steps. The reason therefor lies in the complicated construction of the tire, which is composed of a significant number of different individual components. In addition, this multiplicity of components have to be interconnected under the effect of pressure and temperature, by so-called vulcanization.

Not only the finished tire as the final product of the tire-production process, but also already the tire blank, is a highly complex component that is composed of many semi-finished product elements. As a result of the multilayered construction, the individual components initially and prior to a vulcanization procedure have to be assembled, that is to say that the tire components are supplied to a carcass drum in the correct size in a singularized manner so as to be precise in terms of location, position, and orientation, said carcass drum being located within a tire building machine. The tire blank is produced and prepared for the following vulcanization in this manner.

Many of the tire components are available as web-shaped and/or sheet-shaped semi-finished products. Various rubber mixtures and caoutchouc-based composite materials, woven textile fabrics or textile cord, respectively, woven steel-belt fabrics, and caoutchouc-sheathed bead cores are used. Ply servers are in some instances used within a tire building machine in order for these web-shaped and/or sheet-shaped semi-finished products to be supplied to the carcass drum.

In the case of tire building machines having ply servers and carcass drums being used, significant issues pertaining to the mutual coordination arise by virtue of the required movement kinematics. In order for the individual movement procedures of the ply servers and of the carcass drums to be able to be implemented in spatial terms, corresponding installation spacings are required in order for collisions in the case of the respective linear, rotary, and displacement movements to be avoided before, while, or after the tire components are or have been supplied, respectively, to the carcass drum in the correct size in a singularized manner so as to be precise in terms of location, position, and orientation.

This set of issues arises above all when double-drum carcass machines are used. Double-drum carcass machines are two carcass machines which are disposed so as to be horizontally pivotable on a rotary table. An additional space requirement results from the pivoting movements since the kinematic moving space of the double-drum carcass machines has to be maintained so as to be collision free. On account of the large installation areas required, systems of this type are very cost intensive; additionally, the installation spacings have a negative effect on the production rate.

SUMMARY OF THE INVENTION

It is an object of the invention to reduce the space requirement of tire building machines and thus reduce the investment costs. The production rate is also to be increased.

According to the invention, the individual components of a tire building machine are configured and positioned in a suitable manner, and the movement kinematics of said individual components are controlled during the production process. The objective of the invention lies in increasing the cycle rate by facilitating collision-free movements in particular when a double-drum carcass machine is used. The double-drum carcass machine and one or a plurality of belt servers or ply servers, respectively, are disposed directly next to one another in the tightest space, so as to minimize movement paths and, on account thereof, to increase the cycle times for delivering tire blanks.

The arrangement is performed in such a tight manner that both the external contours of the participating installations as well as the movement ranges of the respective elements are partially superimposed. According to the present invention, the kinematics of the participating construction elements are controlled in such a manner that both a high production rate as well as collision-free operation are guaranteed.

In order for collisions to be avoided, the placing device, the ply server, and optionally also the dynamic shoulder contact rollers are embodied so as to be movable in a linear manner in a horizontal direction. Additionally or alternatively, it is provided according to the invention that the placing device are vertically movable in a linear or pivoting manner; it is provided in particular that in the case of a plurality of placing devices being used, the lower placing device pivots downward, and that the upper placing device pivots upward and away. On account thereof, the double-drum carcass machine in the case of material being supplied can rotate through the components that have been pivoted away in an upward or a downward manner, respectively.

Three or four material supplies are typically used. It is provided that at least two material supplies in the form of ply servers are employed, but the use of only one ply server is also conceivable and expedient, depending on the number of the semi-finished components of the tire blank. At least one placing device is used for each of the material supplies.

A coordination of the pivoting movements can be performed by using at least one rotary cam or by using at least one servomotor, for example. The use of a servomotor enables positional control to be implemented in a simple manner.

A particular advantage of the construction according to the invention and of the method according to the invention lies in that both carcass machines are capable of being aligned in a mutually independent manner. Moreover, both carcass machines can be individually positioned to an initial position, a so-called "zero position", in a mutually independent manner.

A good compromise between a compact construction and good accessibility is reached in that the two carcass machines by way of the longitudinal axes thereof are disposed so as to be substantially mutually parallel and in the longitudinal direction in part mutually superimposed, and by way of the carcass drums thereof are disposed so as to point in mutually opposite directions.

Exemplary embodiments of the invention are schematically illustrated in the drawings, in which:

DETAILED DESCRIPTION OF THE INVENTION

Figure 1:
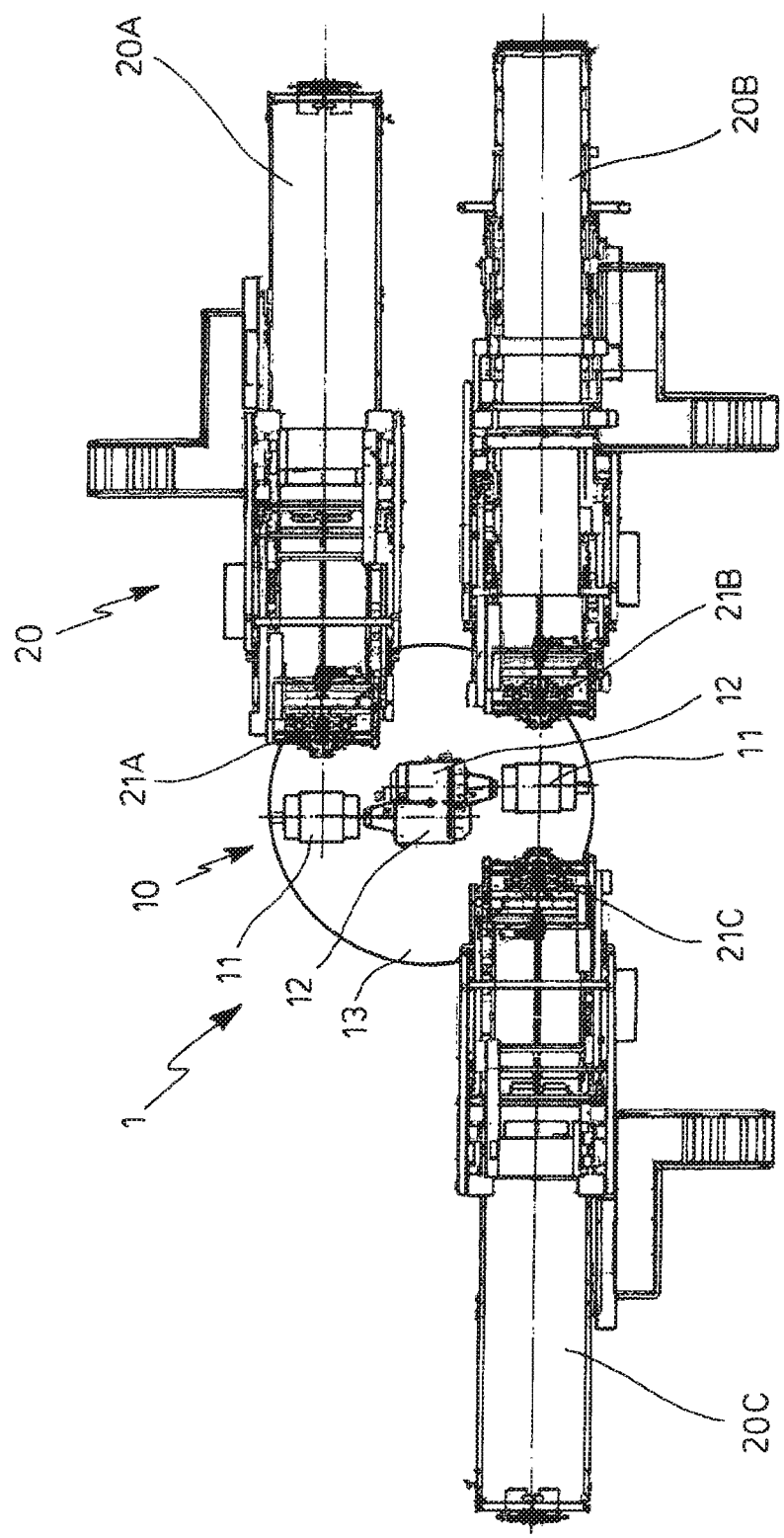
FIG. 1 shows a schematic illustration of the tire building machine (1) according to the invention, in a first exemplary embodiment in a plan view.

FIG. 1 shows the schematic illustration of the tire building machine (1) according to the invention, in a first exemplary embodiment in a plan view. Three ply servers (20A, 20B, 20C) are grouped around a centrally disposed double-drum carcass machine (10).

The double-drum carcass machine (10) is two carcass machines (12) having assigned carcass drums (11) which are disposed on a rotary table (13) so as to be pivotable in a horizontal plane about a vertical axis. The pivoting movement can be stopped at any position, in particular at one or a plurality of feeding positions for feeding the double-drum carcass machine (10) with tire components for tire blanks. The carcass drums (11) are fitted so as to be rotatable on the carcass machines (12).

The three ply servers (20A, 20B, 20C) are disposed in relation to a feeding position of the rotary table (13) of the double-drum carcass machine (10) and to the rotation axes position of the carcass machines (12) that result therefrom such that the carcass drums (11) of the carcass machines (12) can be fed with non-vulcanized rubber material or other web-shaped or sheet-shaped semi-finished materials for the production of tire blanks in a simultaneous and/or a temporally offset manner.

Figure 2:
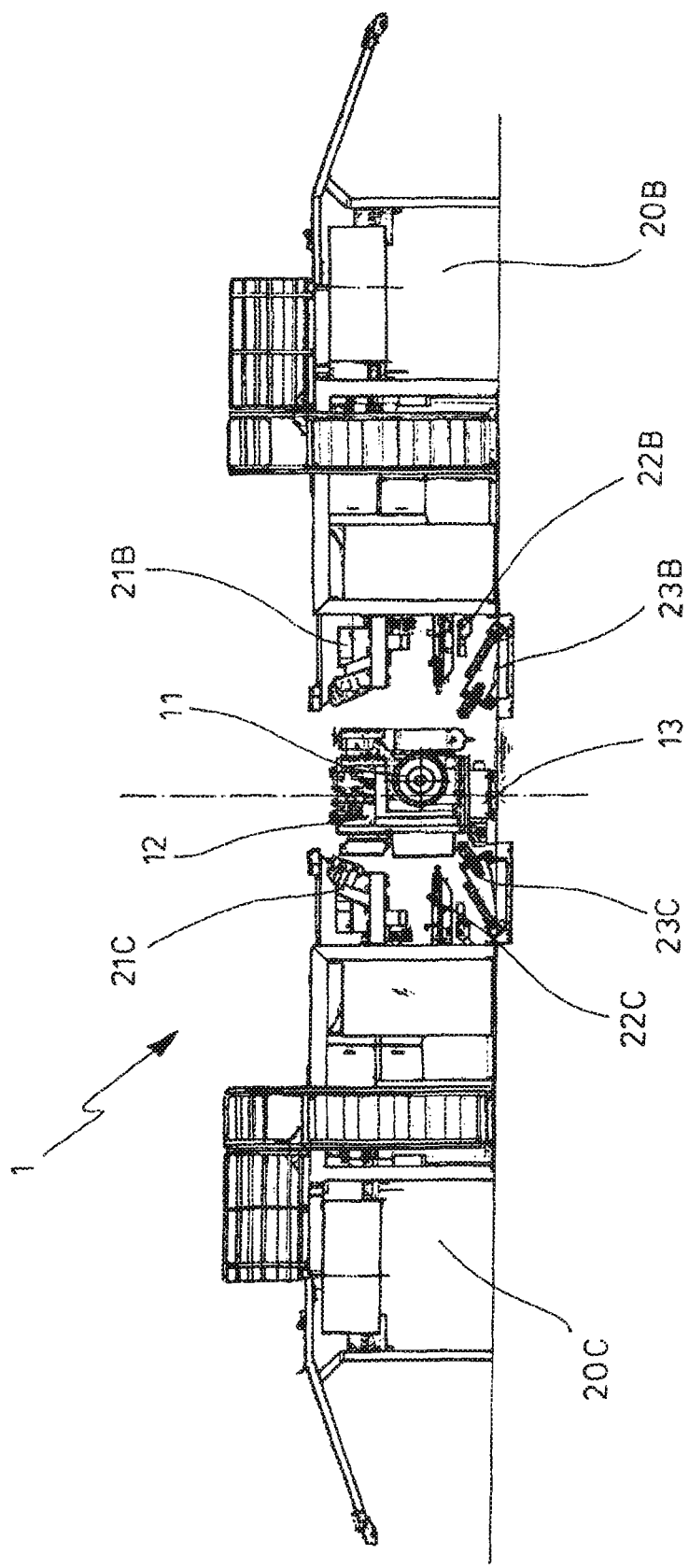
FIG. 2 shows a schematic illustration of the tire building machine (1) according to the invention, in a first exemplary embodiment in a front view.

FIG. 2 shows the schematic illustration of the tire building machine (1) according to the invention, in a first exemplary embodiment in a front view. The ply servers (20A, 20B, 20C) on that side thereof that faces the double-drum carcass machine (10) are specified with upper placing devices (21A, 21B, 21C), lower placing devices (22A, 22B, 22C), and dynamic shoulder contact rollers (23) which are disposed below the lower placing devices (22A, 22B, 22C) of the ply servers (20A, 20B, 20C).

Figure 3:
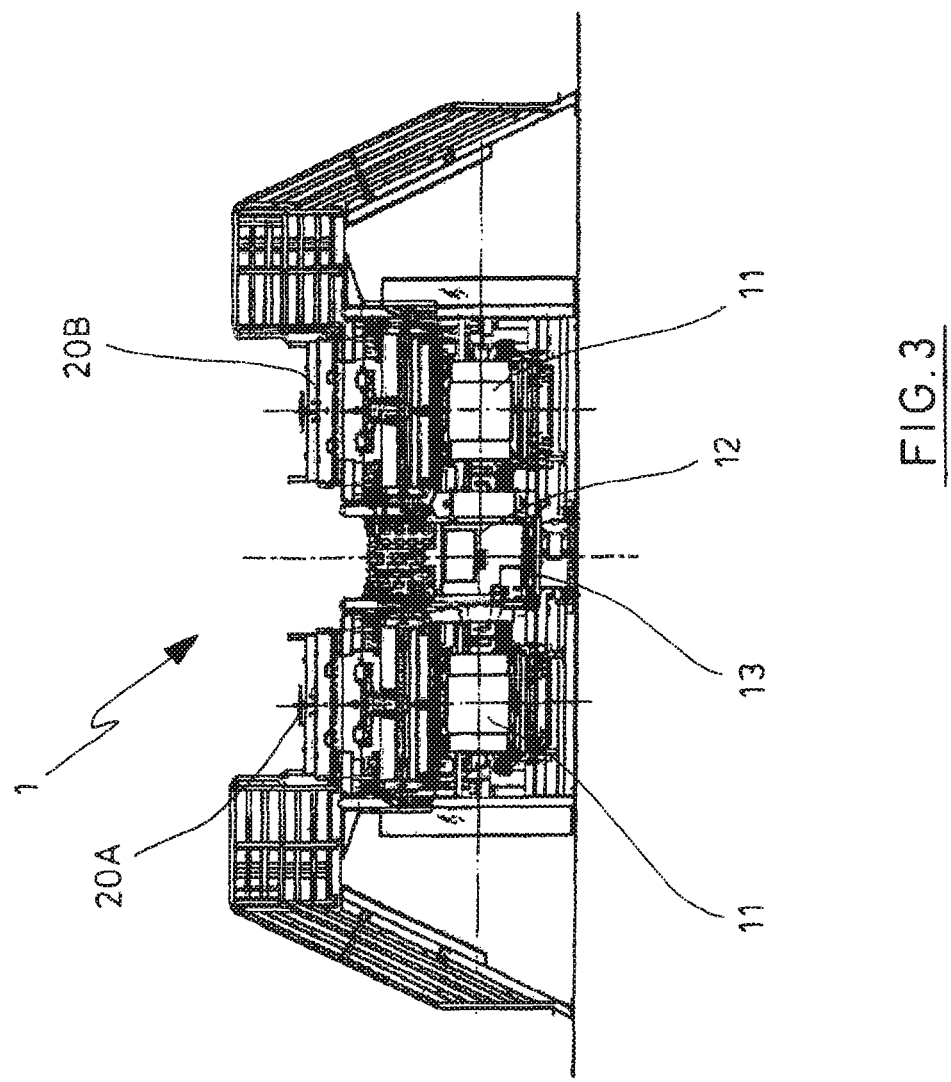
FIG. 3 shows a schematic illustration of the tire building machine (1) according to the invention, in a first exemplary embodiment in a side view.

FIG. 3 shows a schematic illustration of the tire building machine (1) according to the invention, in a first exemplary embodiment in a side view, by means of a sectional illustration along the rotation axes position of the carcass machines (12) according to FIG. 1.

According to the invention, the at least two ply servers (20A, 20B) in spatial terms are disposed so as to be as close as possible to the double-drum carcass machine (10) and are embodied so as to "open".

As close as possible means that the upper placing devices (21A, 21B, 21C), the lower placing devices (22A, 22B, 22C), and the dynamic shoulder contact rollers (23) of the ply servers (20A, 20B, 20C) in the respective feeding position thereof at least in part protrude into the kinematic moving space of the double-drum carcass machine (10) and assume a colliding position when the rotary table (13) pivots the double-drum carcass machine (10) out of the feeding position thereof.

The embodiment so as to open refers to the possibility of the upper placing devices (21A, 21B, 21C) and/or of the lower placing devices (22A, 22B, 22C) and/or of the dynamic shoulder contact rollers (23) of the ply servers (20A, 20B, 20C) being movable in a linear manner in a horizontal direction and, additionally or alternatively, being movable vertically in a linear manner and/or being embodied in a pivotable manner such that the elements that protrude into the kinematic moving space of the double-drum carcass machine (10) are capable of being moved out of the colliding position thereof when the rotary table (13) pivots the double-drum carcass machine (10) out of the feeding position thereof.

If a vertical, linear, or pivoting movement or component of a movement is carried out, particular consideration is awarded to the lower placing devices (22A, 22B, 22C) being movable downward, and to the upper placing devices (21A, 21B, 21C) being movable upward. On account thereof, the double-drum carcass machine (10) in a production phase in which no semi-finished material is being supplied can freely pivot into the then vacated kinematic moving space without any collisions arising.

The opening ply servers (20A, 20B, 20C) according to the invention in spatial terms allow the arrangement thereof to be as close as possible to the double-drum carcass machine (10), in this way facilitating the reduced area and space requirement of the tire building machine (1) while increasing the output by reducing the cycle times and thus the delivery.

The kinematics implemented during operation of the device can be particularly well understood when the illustrations of FIG. 1 and FIG. 2 are combined. It can be seen from FIG. 1 that the rotary table (13) is moved about a vertical axis, and on account thereof the carcass machines (12), disposed on the rotary table (13), with the respective carcass drums (11) thereof are likewise moved in a horizontal direction along circular paths. In order to enable the carcass drums (11) to pass through the placing devices (21, 22), the placing devices (21, 22) are opened by way of at least one vertical movement. The placing devices (21, 22) by way of this opening movement have a mutual spacing in the movement region of the carcass drums (11).

Figure 4:
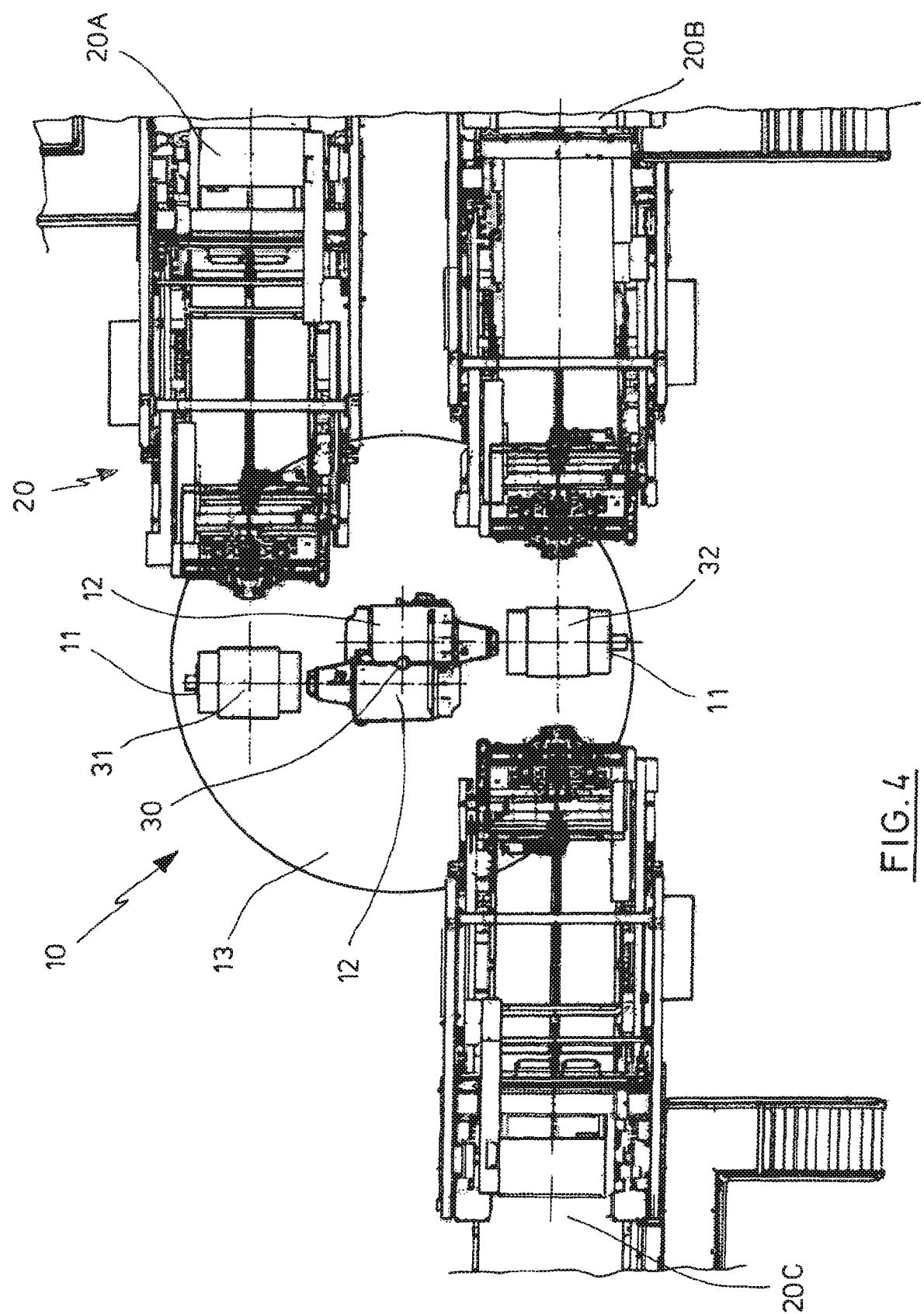
FIG. 4 shows a schematic illustration of two carcass machines which are conjointly disposed on a rotary table and which by way of the longitudinal axes thereof extend so as to be substantially mutually parallel and by way of the assigned carcass drums point in mutually opposite directions.

FIG. 4 in an enlarged fragmented illustration of FIG. 1 visualizes the arrangement of the two carcass machines (12) on the rotary table (13). The rotary table (13) has the vertical rotation axis (30), as has already been mentioned.

The longitudinal axes (31, 32) of the carcass machines (12) are disposed so as to be offset in relation to one another and in relation to the rotation axis (30). The carcass machines (12) in the direction of the longitudinal axes (31, 32) are disposed beside one another at least in portions. The respective carcass drums (11) of the carcass machines (12) point in mutually opposite directions.

The aforedescribed arrangement of the carcass machines (11) on the rotary table (13) combines a compact arrangement with good accessibility both when feeding the carcass drums (11) as well as when carrying out maintenance jobs.

The invention claimed is:

1. A tire building machine for producing tire blanks, said tire building machine comprising: a rotary table having a vertical axis around which the rotary table is pivotable; a double-drum carcass machine arranged on the rotary table and disposed so as to be pivotable with the rotary table in a horizontal plane, wherein the double-drum carcass machine includes two carcass machines each having one carcass drum; and at least one ply server for feeding the double-drum carcass machine with tire components for tire blanks, wherein the at least one ply server has at least one placing device and is configured so as to open and is disposed so that the at least one placing device in a loading position protrudes into a kinematic moving area of the double-drum carcass machine, wherein the at least one placing device is movable in a linear manner in a horizontal direction for supplying material components to the carcass machine, wherein the at least one placing device is movable vertically so that, additionally or alternatively to the horizontal movement, a vertical movement is facilitated and thereby the ply server is configured to open, wherein the at least one placing device is formed by an upper placing device and a lower placing device, wherein the upper placing device and the lower placing device protrude in the loading position into the kinematic moving area of the double-drum carcass machine, and wherein the rotary table is configured so that pivotable movement of the rotary table is interruptable in at least one loading position.

2. The tire building machine for producing tire blanks according to claim 1, wherein three ply servers are disposed on both sides of the double-drum carcass machine.

3. The tire building machine according to claim 1, wherein the at least one ply server is disposed so as to open in a horizontal direction.

4. The tire building machine according to claim 1, wherein the two carcass machines of the double carcass machine have longitudinal axes and are disposed on the rotary table so that the longitudinal axes are substantially parallel.

5. The tire building machine according to claim 1, wherein the carcass machines are mutually offset in a direction of the longitudinal axes.

6. The tire building machine according to claim 1, wherein the carcass machines by way of the carcass drums are disposed so as to point in mutually opposite directions.

7. The tire building machine according to claim 1, wherein the vertical movement of the at least one placing device is a linear or pivoting movement.

8. The tire building machine according to claim 1, wherein the movement capability of the at least one placing device is a combined horizontal and vertical movement.

9. The tire building machine according to claim 1, further comprising lifting cylinders, servomotors, or a rotary cam provided so as to move the at least one placing device.

10. The tire building machine according to claim 1, wherein the lower placing device is movable in a downward manner, and the upper placing device is movable in an upward manner.

* * * * *